(12) United States Patent (10) Patent No.: US 9,298,758 B1
Giordano et al. (45) Date of Patent: Mar. 29, 2016

(54) SYSTEMS AND METHODS PROVIDING MEDIA-TO-MEDIA CONNECTION

(71) Applicant: MiMedia, Inc., Brooklyn, NY (US)

(72) Inventors: Christopher Giordano, New York, NY (US); Gordon C. Mackenzie, III, Providence, RI (US); Mel Reyes, Katonah, NY (US); Nick Faulkner, New York, NY (US); Jourdan Urbach, Brooklyn, NY (US)

(73) Assignee: MiMedia, Inc., Brooklyn, NY (US)

( * ) Notice: Subject to any disclaimer, the term of this patent is extended or adjusted under 35 U.S.C. 154(b) by 163 days.

(21) Appl. No.: 13/801,443

(22) Filed: Mar. 13, 2013

(51) Int. Cl.
*G06F 17/30* (2006.01)
(52) U.S. Cl.
CPC ............................. *G06F 17/30312* (2013.01)
(58) Field of Classification Search
CPC .................................................. G06F 17/30038
See application file for complete search history.

(56) References Cited

U.S. PATENT DOCUMENTS

| | | | |
|---|---|---|---|
| 5,778,395 A | 7/1998 | Whiting et al. |
| 5,835,953 A | 11/1998 | Ohran |
| 5,926,624 A | 7/1999 | Katz et al. |
| 6,212,512 B1 | 4/2001 | Barney et al. |
| 6,480,867 B1 | 11/2002 | Kwan |
| 7,035,943 B2 | 4/2006 | Yamane et al. |
| 7,346,512 B2 | 3/2008 | Li-Chun Wang et al. |
| 7,509,684 B2 | 3/2009 | McDonald et al. |
| 7,660,834 B2 | 2/2010 | Cannon et al. |
| 7,673,240 B2 | 3/2010 | Morgan |
| 7,685,175 B2 | 3/2010 | Carroll et al. |
| 7,873,040 B2 | 1/2011 | Karlsgodt |
| 8,090,690 B2 | 1/2012 | Zamkoff et al. |
| 8,095,606 B1 | 1/2012 | Wiley et al. |
| 8,135,800 B1 | 3/2012 | Walsh et al. |
| 8,209,540 B2 | 6/2012 | Brouwer et al. |
| 8,554,735 B1 | 10/2013 | Wible et al. |
| 2002/0083366 A1 | 6/2002 | Ohran |
| 2002/0133387 A1 | 9/2002 | Wilson et al. |
| 2003/0038834 A1 | 2/2003 | Wen et al. |
| 2003/0055671 A1 | 3/2003 | Nassar |
| 2003/0098894 A1 | 5/2003 | Sheldon et al. |
| 2004/0158546 A1 | 8/2004 | Sobel et al. |
| 2004/0177319 A1 | 9/2004 | Horn |
| 2004/0193672 A1 | 9/2004 | Samji et al. |
| 2004/0236859 A1 | 11/2004 | Leistad et al. |
| 2005/0071392 A1 | 3/2005 | Sandorfi et al. |

(Continued)

OTHER PUBLICATIONS

Conner, N., "Using ITunes® 10", (Jan. 25, 2011), Que, p. 14 and p. 129.

(Continued)

*Primary Examiner* — Mohammad S Rostami
(74) *Attorney, Agent, or Firm* — Norton Rose Fulbright US LLP (57) ABSTRACT

Systems and methods which provide direct connections between digital media content are shown. Embodiments provide media-to-media (MTM) connections which directly and autonomously couple digital media content files. The MTM connections of embodiments facilitate enhanced digital media content use, such as to provide simultaneous presentation, coping, and/or manipulation of multiple digital media content files which are connected when a user accesses one such digital media content file. MTM connections provided according to embodiments of the invention may be one-to-one, one-to-many, many-to-many, and many-to-one as well as unidirectional or bidirectional.

42 Claims, 3 Drawing Sheets

(56) References Cited

U.S. PATENT DOCUMENTS

| | | |
|---|---|---|
| 2005/0102635 A1 | 5/2005 | Jiang et al. |
| 2005/0108253 A1 | 5/2005 | Metsatahti et al. |
| 2005/0114595 A1 | 5/2005 | Karr et al. |
| 2005/0131902 A1 | 6/2005 | Saika |
| 2005/0138066 A1 | 6/2005 | Finke-Anlauff et al. |
| 2005/0223277 A1 | 10/2005 | Ballard |
| 2006/0015637 A1 | 1/2006 | Chung |
| 2006/0036611 A1 | 2/2006 | Rothschild |
| 2006/0155790 A1 | 7/2006 | Jung et al. |
| 2006/0161635 A1 | 7/2006 | Lamkin et al. |
| 2006/0179079 A1 | 8/2006 | Kolehmainen |
| 2006/0195512 A1 | 8/2006 | Rogers et al. |
| 2006/0224602 A1 | 10/2006 | Rawat et al. |
| 2006/0230440 A1 | 10/2006 | Wu et al. |
| 2006/0242325 A1 | 10/2006 | Ramaswamy et al. |
| 2006/0277123 A1 | 12/2006 | Kennedy et al. |
| 2006/0288168 A1 | 12/2006 | Stevenson |
| 2006/0291720 A1 | 12/2006 | Malvar et al. |
| 2007/0048714 A1 | 3/2007 | Plastina et al. |
| 2007/0055993 A1 | 3/2007 | Braun et al. |
| 2007/0088678 A1 | 4/2007 | Farago et al. |
| 2007/0106714 A1 | 5/2007 | Rothbarth |
| 2007/0122111 A1 | 5/2007 | Yamamoto et al. |
| 2007/0130400 A1 | 6/2007 | Reisman |
| 2007/0288536 A1 | 12/2007 | Sen et al. |
| 2007/0296581 A1 | 12/2007 | Schnee et al. |
| 2008/0022058 A1 | 1/2008 | Nadathur et al. |
| 2008/0040139 A1 | 2/2008 | Pousti et al. |
| 2008/0060069 A1 | 3/2008 | Vindici |
| 2008/0082678 A1 | 4/2008 | Lorch et al. |
| 2008/0109414 A1 | 5/2008 | Chun et al. |
| 2008/0115071 A1 | 5/2008 | Fair |
| 2008/0126303 A1 | 5/2008 | Park et al. |
| 2008/0133622 A1 | 6/2008 | Brown et al. |
| 2008/0222734 A1 | 9/2008 | Redlich et al. |
| 2008/0250190 A1 | 10/2008 | Johnson |
| 2008/0270395 A1 | 10/2008 | Gossweiler, III et al. |
| 2008/0294453 A1 | 11/2008 | Baird-Smith et al. |
| 2008/0306872 A1 | 12/2008 | Felsher |
| 2008/0307314 A1 | 12/2008 | Cisler et al. |
| 2008/0319856 A1* | 12/2008 | Zito et al. .................. 705/14 |
| 2009/0006643 A1 | 1/2009 | Lee |
| 2009/0019486 A1 | 1/2009 | Kalaboukis |
| 2009/0022129 A1 | 1/2009 | Karaoguz et al. |
| 2009/0024675 A1 | 1/2009 | Hewitt et al. |
| 2009/0132921 A1 | 5/2009 | Hwangbo et al. |
| 2009/0178003 A1 | 7/2009 | Fiedler |
| 2009/0240735 A1 | 9/2009 | Grandhi et al. |
| 2009/0252033 A1* | 10/2009 | Ramakrishnan et al. ..... 370/228 |
| 2009/0282336 A1* | 11/2009 | Lindley et al. ............... 715/716 |
| 2009/0327904 A1 | 12/2009 | Guzak et al. |
| 2010/0094728 A1 | 4/2010 | Denning et al. |
| 2010/0180213 A1 | 7/2010 | Karageorgos et al. |
| 2010/0241731 A1 | 9/2010 | Du et al. |
| 2010/0325549 A1 | 12/2010 | Gibson et al. |
| 2011/0004683 A1* | 1/2011 | Kottomtharayil et al. .... 709/224 |
| 2011/0060994 A1* | 3/2011 | Maxwell et al. .............. 715/730 |
| 2011/0060998 A1 | 3/2011 | Schwartz et al. |
| 2011/0106910 A1 | 5/2011 | Grasset |
| 2011/0243534 A1 | 10/2011 | Thomas et al. ............... 386/278 |
| 2012/0047119 A1* | 2/2012 | Kandekar et al. ............ 707/705 |
| 2012/0072956 A1* | 3/2012 | Thomas et al. .................. 725/88 |
| 2012/0210220 A1 | 8/2012 | Pendergast et al. |
| 2012/0210351 A1* | 8/2012 | Nukala et al. .................... 725/35 |
| 2012/0265604 A1* | 10/2012 | Corner et al. .............. 705/14.39 |
| 2012/0330963 A1* | 12/2012 | Bartholomew .............. 707/740 |
| 2013/0024582 A1* | 1/2013 | Rodrigues .................... 709/231 |
| 2013/0061131 A1* | 3/2013 | Zito et al. ...................... 715/234 |
| 2013/0066856 A1* | 3/2013 | Ong et al. ..................... 707/722 |
| 2013/0173531 A1 | 7/2013 | Rinearson et al. |
| 2014/0188890 A1 | 7/2014 | Clifton et al. |

OTHER PUBLICATIONS

Linder, "Humyo offers 30GB of free online storage", Jun. 25, 2008, [retrieved on Jul. 23, 2013], retrieved from the Internet: URL: http://downloadsquad.switched.com/2008/06/25/humyor-offers-30gb-of-free-online-storage/1 page.

W3Schools.com, "AJAX Introduction", Apr. 19, 2010, [retrieved on Jul. 24, 2013], retrieved from the Internet: URL: http://web.archive.org/web/20100419011010/http://www.w3schools.com/ajax/ajax_intro.asp/, p. 1-2.

International Search Report and Written Opinion issued for PCT/US2010/036105, dated Jul. 13, 2010, 11 pages.

Apple Inc., "iTunes 8", © 2009, ver. 8.2.1.6, p. 1-14.

Pash, "Huymo Provides 30GB of Free Online Storage", Jun. 25, 2008, [retrieved from the Internet on Oct. 22, 2014], <URL http://lifehacker.com/397108/huymo-provides-30gb-of-free-online-storage/>, p. 1-9.

Unpublished U.S. Appl. No. 13/103,744 to Wible, et al., filed May 9, 2011 and entitled "Centralized Music Media Gallery."

Unpublished U.S. Appl. No. 13/103,720 to Wible, et al., filed May 9, 2011 and entitled "Centralized Media Access Portal."

Newman, "Amazon Cloud Drive and Cloud Player: A Hands-On Tour", Mar. 29, 2011, <URL http://www.pcworld.com/article/223604/Amazon_Cloud_Drive_and_Cloud_Player_A_Hands_On_Tour.html/>, p. 1-3.

Apple, Inc., "ITunes 8", (C)2009, ver.8.2.1.6, p. 1-17.

* cited by examiner

SYSTEMS AND METHODS PROVIDING MEDIA-TO-MEDIA CONNECTION

CROSS-REFERENCE TO RELATED APPLICATIONS

The present application is related to co-pending and commonly assigned U.S. patent application Ser. No. 13/103,693 entitled "Systems and Methods for Data Upload and Download," filed May 9, 2011, Ser. No. 13/103,720 entitled "Centralized Media Access Portal," filed May 9, 2011, the disclosures of which are incorporated herein by reference.

TECHNICAL FIELD

The invention relates generally to digital media and, more particularly, to providing direct connections between digital media.

BACKGROUND OF THE INVENTION

The generation, collection, and use of various forms of digital media content is quite common today. For example, with the proliferation of consumer electronics, such as personal computers having document generation and media content capabilities, digital video recorders, digital cameras, digital recorders, and smart devices having image and/or sound recording features readily available to capture various content, and personal digital media players and smart devices having image and/or sound reproduction features almost omnipresent to provide playback of the various content, the instances of digital media content created by and available to users is quite large. Accordingly, it is quite common for users generate and store large numbers of digital documents, photographs, videos, sound files, etc. for business and personal use.

The various digital media content files are independent of one another. That is, each digital media content file is detached from other digital media content files. Accordingly, user access to and utilization of such digital media content takes place within discrete information silos determined by media type, file type, and other arbitrary and non-arbitrary factors due to the architecture and design of current media consumption solutions.

Various techniques have been implemented to associate various digital media content together. For example, a user may employ a simple hierarchical folder or directory (collectively referred to herein as folders) structure in which various digital media content is associated only through their inclusion in a same folder or folder tree. Such organizational techniques employed for storing and thus later accessing digital media content tends to be manual and relatively simplistic and provides for the digital media content being temporarily associated but unconnected. For example, if a user accesses one digital media content file in a folder, all other digital media content files "associated" with that digital media content file by being stored in the same folder remain unaffected due to there being no connection between the digital media content. If a digital media content file is moved from a folder, its "association" with the other digital media content files therein is terminated due to there being no connection there between.

Another technique implemented to associate digital media content together has been to use keywords or tags appended to the digital media content files. For example, keywords or tags may identify the subject matter of the digital media content file. Thus, search engines may operate to identify associations between different digital media content through reference to the tags assigned to the separate digital media content files. The digital media content, however, remains unconnected as each digital media content is detached from all other digital media content, with only some external system (e.g., search engine) providing the association using keyword or tag matching.

BRIEF SUMMARY OF THE INVENTION

The present invention is directed to systems and methods which provide direct connections between digital media content. Embodiments of the invention provide media-to-media (MTM) connections which directly and autonomously couple digital media content files. Accordingly, the digital media content itself is cognizant of its connection to other digital media content. Such MTM connections provide a linking between digital media content which is more resilient than the associations implemented in the past. Moreover, the MTM connections of embodiments herein facilitate enhanced digital media content use, such as to provide simultaneous presentation, coping, and/or manipulation of multiple digital media content files which are connected when a user accesses one such digital media content file.

MTM connections provided according to embodiments of the invention may be one-to-one, one-to-many, many-to-many, and many-to-one. Moreover, such MTM connections may be unidirectional (i.e., a first digital media content file is connected to a second digital media content file without that second digital media content file also being connected to the first digital media content file) or bidirectional (i.e., a first digital media content file is connected to a second digital media content file and that second digital media content file is also being connected to the first digital media content file). It should be appreciated that in "many" connections (i.e., one-to-many, many-to-many, and many-to-one) the connections may be unidirectional, bidirectional, or a combination thereof.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
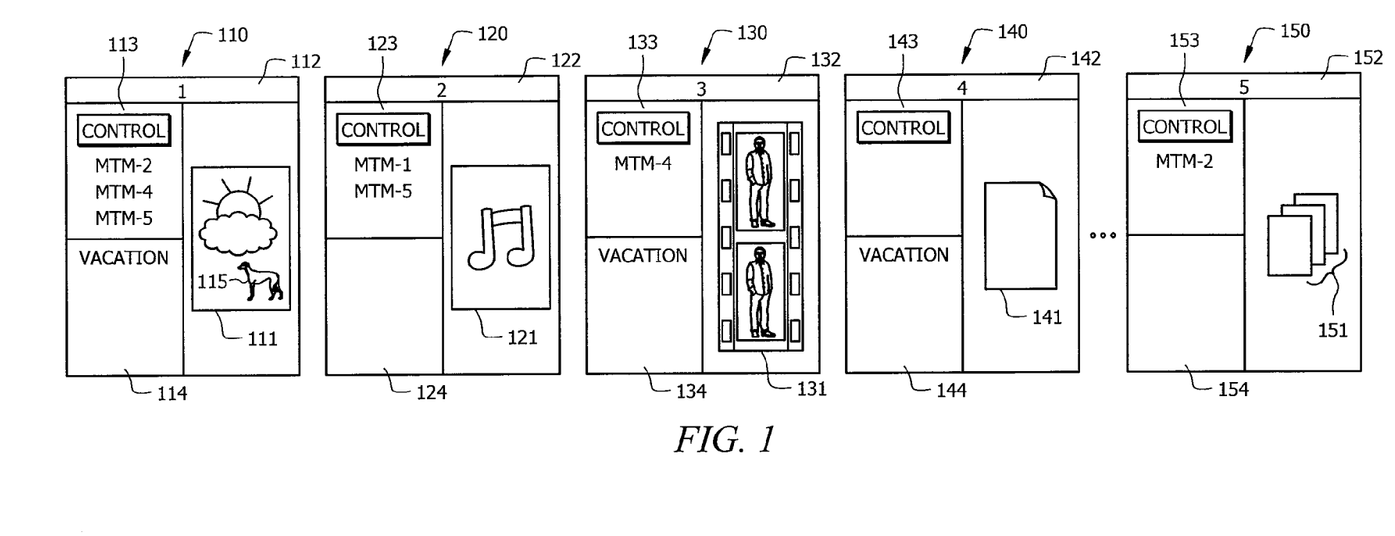
FIG. 1 illustrates media-to-media connections provided with respect to various types of digital media content according to embodiments of the invention.

Embodiments of the present invention provide media-to-media (MTM) connections which directly and autonomously couple digital media content files. The digital media content files for which MTM connections are provided according to embodiments herein may comprise various forms of digital media, such as photographs, music, video, documents, etc., and combinations thereof. Moreover, the digital media content files for which MTM connections are provided herein may be more complex than a digital media content file comprising a single instance of digital media content. For example, the digital media content files may comprise collections or stacks of digital media content (e.g., photo slide shows, music albums, document libraries, etc.). Examples of the foregoing digital media content files are shown in FIG. 1, wherein digital media content file 110 comprises photograph content 111, digital media content file 120 comprises music content 121, digital media content file 130 comprises video content 131, digital media content file 140 comprises document content 141, and digital media content file 150 comprises content (e.g., photographic, music, video, document, etc.) stack 151.

In accordance with embodiments of the invention, digital media content files are adapted to facilitate direct connections between digital media content. For example, the digital media content files of the illustrated embodiment, in addition to the actual media content, comprise identification information and MTM connection information for use in creating connections between digital media content files.

Identification information 112, 122, 132, 142, and 152, of digital media content files 110, 120, 130, 140, and 150 respectively, provide substantially unique identification (i.e., unique amongst the particular group of digital media content files) for each digital media content file of the exemplary embodiment. The identification information may, for example, comprise any form of information providing the aforementioned substantially unique identification with respect to the digital media content files. For example, the identification information may comprise alphanumeric strings, serial numbers, a hash function of the content, etc.

MTM connection information 113, 123, 133, 143, and 153, of digital media content files 110, 120, 130, 140, and 150 respectively, provide information regarding the particular media-to-media connections for their respective digital media content. The information may, for example, comprise any form of information providing an indication of a direct connection between the content of the digital media content file and content of one or more other digital media content file. For example, the MTM connection information may comprise a media-to-media connection designator (e.g., "MTM" in the illustrated embodiment) to indicate that a media-to-media connection is being indicated and identification information (e.g., the aforementioned identification information for a particular digital media content file) identifying the particular connected one or more other digital media content file. It should be appreciated that media-to-media connection designators may be foregone according to embodiments of the invention, such as where a protocol or data structure facilitates identification of identification information as relevant to media-to-media connections herein. The identification information of the MTM connection information may include the identification information for a connected file (e.g., identification information 112, 122, 132, 142, and/or 152) as well as other information relevant to facilitating MTM connections herein. For example, MTM connection information may include file path information for the connected digital media content files, index information for an index maintaining information regarding connected digital media content files, etc.

As can be appreciated from the examples of the embodiment illustrated in FIG. 1, various individual digital media content files, and thus the digital media content therein, may be connected using the foregoing identification information and MTM connection information. In particular, the MTM connection information provided with respect to a digital media content file indicates the particular digital media content file or files connected to the digital media content file. Accordingly, the digital media content file is itself cognizant of its connection to other digital media content files.

For example, in the illustrated embodiment photograph content 111 of digital media content file 110 is connected to music content 121 of digital media content file 120, document content 141 of digital media content file 140, and content stack 151 of digital media content file 150 by MTM connection information 113 and identification information 122 and 152. Likewise, music content 121 of digital media content file 120 is connected to photograph content 111 of digital media content file 110 and content stack 151 of digital media content file 150 by MTM connection information 123 and identification information 112 and 152; video content 131 of digital media content file 130 is connected to document content 141 of digital media content file 140 by MTM connection information 133 and identification information 142; and content stack 153 of digital media content file 150 is connected to music content 121 of digital media content file 120 by MTM connection information 153 and identification information 122.

It should be appreciated from the foregoing that MTM connections provided according to embodiments of the invention may be one-to-one (e.g., as shown by MTM connection information 133 to content of digital media content file 140), one-to-many (e.g., as shown by MTM connection information 113 to content of digital media content files 1120, 140, and 150), many-to-many (e.g., as shown by MTM connection information 113 to content of digital media content files 120, 140, and 150 and MTM connection information 123 to content of digital media content files 110 and 150), and many-to-one (e.g., as shown by MTM connection information 113 and 133 to content of digital media content file 140). Moreover, such MTM connections may be unidirectional (e.g., as shown by MTM connection information 133 to content of digital media content file 140 without there being a reciprocal connection from the content of digital media content file 140 to content of digital media content file 130) or bidirectional (e.g., as shown by MTM connection information 113 to content of digital media content file 120 and MTM connection information 123 to content of digital media content file 110).

The foregoing MTM connections facilitate enhanced digital media content use according to embodiments herein. In operation according to embodiments of the invention, the MTM connections provide simultaneous presentation, coping, and/or manipulation of multiple digital media content files which are connected. For example, when a user accesses one such digital media content file digital media content of the one or more connected digital media content files may likewise be accessed. As a specific example, if a user accesses digital media content file 110 to view photograph content 111, MTM connection information 113 may be utilized to identify music content 121 as connected and thus simultaneously accessed for playback. Accordingly, as the user views the photograph, musical content the user associated with that photograph may be played while the photograph is viewed. It should be appreciated that a one-to-many relationship may operate to access multiple connected content. Continuing with the foregoing example, in addition to initiating playback of the connected music content, accessing the photograph may utilize MTM connection information 113 to identify video content 131 (e.g., a video presentation the user links to the photographic content) and content stack 151 (e.g., a slide show presentation the user links to the photographic content) for playback.

Using the MTM connections provided according to embodiments of the invention, a user is enabled to create and utilize direct connections between digital media content. As one example of a use scenario implementing MTM connections herein, a user may create a connection (whether bidirectional or unidirectional) between one or more of the user's wedding photographs and one or more musical scores played at the wedding, the betrothed couple's "song", etc. such that when the user accesses a wedding photograph to view the image the connected music is played to the user (e.g., playing each connected musical content in turn, playing a connected musical content in a loop, etc. while the photograph or photographs are being viewed). Likewise, using a bidirectional connection, when the user accesses one of the musical scores or the couple's song the connected photograph or photographs may be presented for viewing by the user (e.g., displaying each connected photograph in turn, displaying a particular photograph continuously, etc. while the music is being played). Additionally or alternatively, the user may create a connection (whether bidirectional or unidirectional) between one or more of the individual wedding photographs and one or more album or slide show (e.g., content stack) such that when the user accesses a wedding photo the connected album or slide show is displayed (e.g., displaying each photograph of the album or slide show in turn). Where the aforementioned connection to musical content is also provided with respect to the photograph accessed by the user, the connected music may also be played in combination with the displaying of the connected album or slide show.

As another example of a use scenario implementing MTM connections herein, a user may create connections between vacation photographs, vacation videos, and documents relating to the vacation. For example, the user may have taken a vacation to a beach resort where a number of photographs and videos of the vacation and the user's experiences during the vacation were taken. The user may also acquire (e.g., by purchase, through downloading publically available content, provided by other individuals, etc.) additional photographic and/or video content. The user may create connections (whether bidirectional or unidirectional) between any and all such content to provide display of the connected content (e.g., one after another, simultaneously, or a combination thereof) when a particular photograph or video is accessed for viewing by the user. In this example, not only are photographs and videos relevant to the user's vacation connected, but documents are also connected. Accordingly, when a particular photograph or video is accessed for viewing by the user, a connected document (e.g., a certificate issued to the user from a fishing competition during the vacation, a rental agreement for the cottage stayed at during the vacation, etc.) may also be accessed for viewing by the user. Similarly, when the document is accessed for viewing by the user, connected photographs and/or videos may be presented to the user for viewing.

The foregoing examples give specific use examples which aid in appreciating the various direct content connections that may be provided according to embodiments of the invention. In particular, it should be appreciated that not only is a user provided access to connected content when accessing particular content, but the content connected can be of any media. Although the foregoing examples illustrate thematic connections (e.g., content related by a wedding theme or a vacation theme), the connections established using MTM connections of embodiments of the invention can be for any relational reason (e.g., thematic, shared subject matter, date related, event based, etc.) or no relational reason (e.g., random association by the user).

The content connections provided according to embodiments of the invention are not limited to accessing the various content. Content connections implemented according to embodiments of the invention may, for example, facilitate linking of functions such as file movement, copying content, deleting content, etc. For example, MTM connection information may be utilized to identify connected content for performing particular file management operations with respect to connected content when the user performs the file management operation with respect to one digital media content file. A user may, for example, select one digital media content file for copying and through the use of MTM connections herein actually copy a group of connected digital media content files. Accordingly, through specifying various content connections a user may connect specific content to other specific content for use in accessing and managing the content.

MTM connection information utilized according to embodiments of the invention may include information in addition to that identifying the connected content. For example, MTM connection information may comprise one or more control aspect to be utilized with respect to the MTM connections established. Such control aspects may facilitate control with respect to the connections maintained between the content, whether collectively or individually. As an example, MTM connection information 113 may include a control aspect with respect to any or all of the content connections specified therein (i.e., MTM-2, MTM-4, and MTM-5) that one or more management operation (e.g., copying, moving, deleting, backup, etc.) does or does not apply, such that when the management operation is performed with respect to photograph content 111 the management operation is or is not performed with respect to music content 121, document content 141, and/or content stack 151 as specified by the management aspects associated therewith. Correspondingly, control aspects of the MTM connection information may additionally provide for connection maintenance operations, such as to facilitate updating or other maintenance of file path information for the connected digital media content files, index information for an index maintaining information regarding connected digital media content files, etc. in association with performance of particular management operations (e.g., copying, moving, deleting, etc. a connected digital media content file).

Control aspects utilized according to embodiments of the invention may provide connection control with respect to content utilization in addition to or in the alternative to the aforementioned management operation. For example, connection control may be provided with respect to accessing the content by control aspects herein. In operation according to embodiments, control aspects may designate how access of connected content is to be conducted. As one example, a control aspect may specify concatenated access for linking one-to-many content access (e.g., access to music content 121 may also result in access to photograph content 111 as provided by MTM connection information 123 whereby a control aspect of MTM connection information 113 may additionally provide for concatenated access to document content 141 and/or content stack 151 to thereby result in content access beyond the connections specified with respect to music content 121).

Designation of how access of connected content is to be conducted provided by control aspects herein may provide control in addition to or in the alternative to the foregoing exemplary concatenation. For example, control aspects may establish an access hierarchy and/or other access protocols. Where a plurality of content is connected, control aspects may designate which content is to be access simultaneously (e.g., music to be accessed simultaneously with photographs and/or documents), which content is to be accessed serially (e.g., multiples of a same type of content are to be accessed one after the other), which content is to be foreground and/or background (e.g., particular forms of content may be selected for foreground presentation and/or other forms of content may be selected for background presentation), etc. The foregoing designations by control aspects may be with respect to specific digital media content, with respect to types of digital media content, etc.

It should be appreciated that MTM connections of embodiments of the invention provide a linking between digital media content which is more resilient than the associations implemented in the past. For example, the aforementioned identification information and MTM connection information remains with the digital media content file and thus the connections of embodiments herein are maintained when the various digital media content files are moved, copied, etc.

Information in addition to the information utilized in providing MTM connections according to the concepts herein (e.g., the aforementioned identification information and MTM connection information) may also be provided with respect to the digital media content files, if desired. For example, tagging information 114, 124, 134, 144, and 154 is shown in the illustrated embodiment as being provided for digital media content files 110, 120, 130, 140, and 150 respectively. Such tagging information may provide keywords or tags appended to the digital media content files (e.g., keywords or tags identifying the subject matter of the digital media content file). Search engines, for example, may operate to identify associations between different digital media content through reference to the tags assigned to the separate digital media content files. Accordingly, in addition to the MTM connections provided according to embodiments of the invention, the digital media content files may implement more traditional associations, such as to facilitate legacy operations with respect to the digital media content files, to facilitate multiple means of accessing the content, etc.

Figure 2:
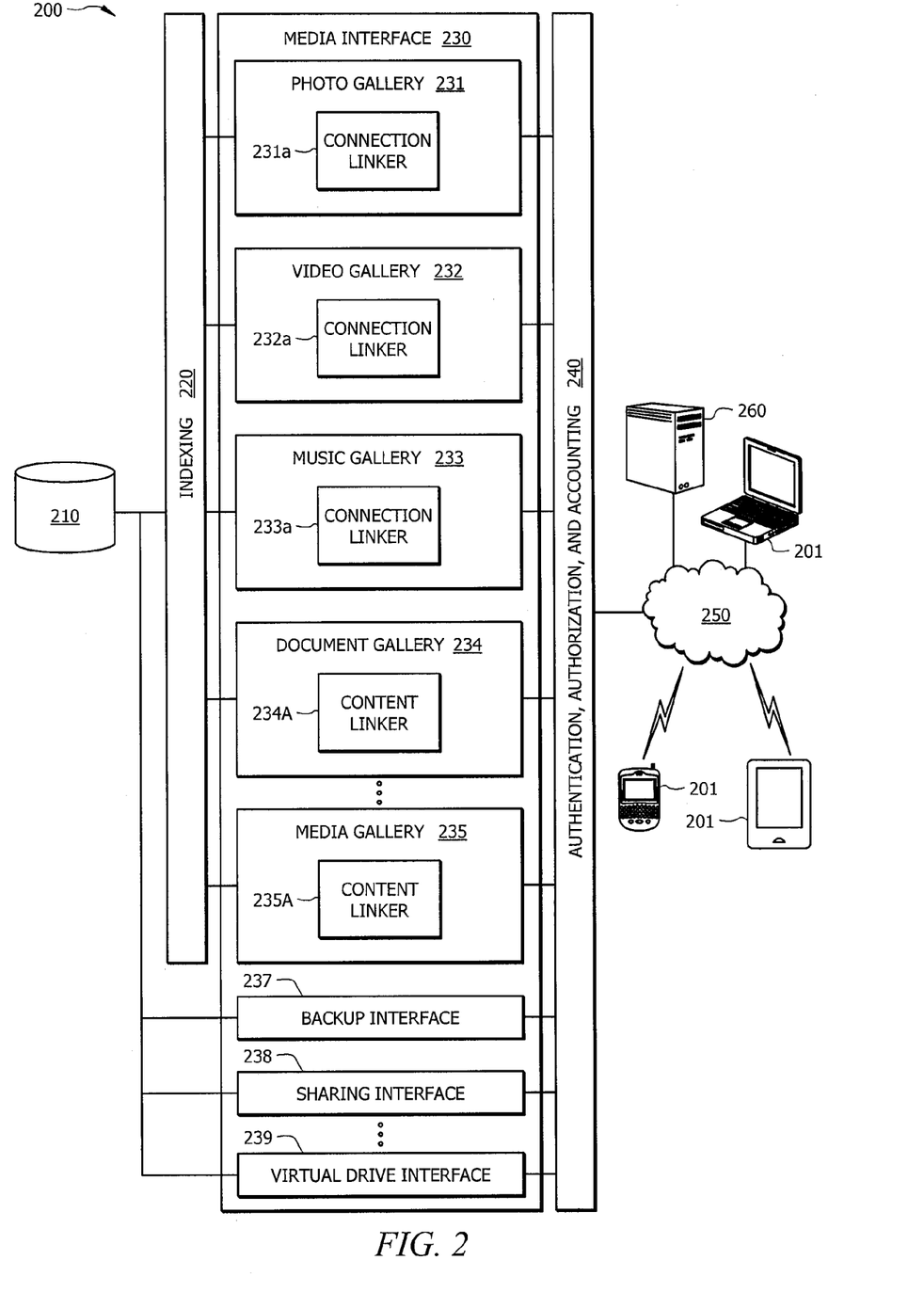
FIG. 2 shows a system adapted to implement media-to-media connections according to embodiments of the invention.

Having described MTM connections and information utilized in providing MTM connections of embodiments of the invention, reference is now made to FIG. 2 wherein a system adapted to implement MTM connections according to embodiments of the invention is shown. In particular, FIG. 2 shows a high level block diagram of a centralized media access portal facilitating robust multiplatform access to digital media content such as digital music, digital video, digital photos, multimedia files, digital books, office productivity files according to embodiments of the invention. MTM connections may be implemented with respect to any or all such digital media content files through operation of media access portal 200 of the illustrated embodiment.

Media access portal 200 is shown coupled to network 250, such as may comprise a local area network (LAN), metropolitan area network (MAN), wide area network (WAN), wireless network (e.g., wireless local area network (WLAN), wireless metropolitan area network (WMAN), cellular network, etc.), the Internet, and/or the like, providing multiplatform access by user devices 201 to digital media content stored by database 210. In accordance with embodiments of the invention, user devices for which accessibility to digital media is provided may include PCs, PESs, PDAs, and PCSs. The access to digital media content provided to user devices 201 by media access portal 200 of embodiments may be with and/or without the use of specialized clients.

Embodiments of media access portal 200 are adapted for uploading and downloading digital media content files as well as viewing and sharing digital media content with respect to a plurality of user devices. Accordingly, the illustrated embodiment of media access portal 200 comprises database 210 for storing digital media content files, indexing system 220 and media interface 230 for facilitating robust access to digital media content files, and authentication, authorization, and accounting (AAA) system 240 for controlling access all cooperating to provide viewing and sharing of digital media content files for user devices 201 coupled to media access portal 200 through network 250.

Some or all of indexing system 220, media interface 230, and AAA system 240 of embodiments herein may be implemented in software operable with respect to appropriate hardware circuitry. Accordingly, elements of embodiments of the present invention comprise code segments operable upon a computer system (e.g., a processor-based computer having memory, input/output, user interface, etc., as are well known in the art) to perform tasks as described herein. The code segments can be stored on a computer readable medium, such as random access memory (RAM), read only memory (ROM), magnetic memory, optical memory, etc., which may be accessed by a host computer system for executing the code. For example, code segments providing portions of indexing system 220, media interface 230, and/or AAA system 240 may be stored on a portion of database 210 for execution by a processor (not shown) of media access portal 210. The computer system may comprise various subsystems, such as a network interface card (NIC), disk controller, cache memory, application specific integrated circuit (ASIC), etc., utilized in cooperation with the foregoing code segments for providing operation as described herein.

According to an operational aspect of media access portal 200 of embodiments, digital media content files stored by one or more of user devices 201 are communicated to a mass storage system of the media access portal (e.g., database 210), thereby providing backup of such digital media content files on a network based mass storage system. For example, digital media content files may be backed up to database 210 of media access portal 200 through cooperative operation of AAA system 240 and media interface 230 using techniques as shown and described in the two above referenced patent applications entitled "SYSTEMS AND METHODS FOR DATA UPLOAD AND DOWNLOAD." Communication of the digital media, or some portion thereof, to the media access portal system may be automated, such as to provide for periodic file backup, backup of modified files, etc.

In operation according to embodiments of the invention, AAA system 240 may authenticate a user and/or user device as an appropriate client of media access portal 200 and provide authorization to access an account, and thus digital media content files and storage space, associated with the user and/or user device. AAA system 240 may additionally or alternatively provide accounting functions, such as to generate records regarding duration of access, size (e.g., bits/bytes) of data transferred, size (e.g. bits/bytes) of data stored, type of access, etc., such as for accounting (e.g., charge for services), statistical, load balancing, and/or other purposes.

Assuming access is granted by AAA system 240, backup interface 237 may operate to receive digital media content files uploaded by a user device, associate the uploaded digital media content files with the appropriate user account, and store the digital media content files on database 210. In operation according to a preferred embodiment, backup interface 237 causes the digital media content files to be stored on database 210 in a file structure which corresponds to the file structure employed by the user device. For example, a file and folder hierarchy employed by the user device when storing the digital media content files is maintained when copies of those files are stored on database 210 by backup interface 237. These digital media content files may thus be accessed, such as for restoring data to a user device, in a similar manner and using a same file navigation scheme as is native to the user device from which the digital media content files were provided. Media access portal 200 of embodiments, therefore, provides a network based mass storage system for digital file backup. A user device may thus subsequently access media access portal 200, being authenticated and authorized by AAA system 240 and utilizing backup interface 237, to access copies of various digital media content files stored by database 210, wherein a file navigation structure consistent with that of the user device originally providing the files is used to locate desired files.

It should be appreciated that the digital media content files stored by media access portal 200 may be accessed by any of a number of user devices (e.g., any of user devices 201), whether the same as or different from the particular user device originally storing the files. Where a particular user elects to communicate the digital media content files of a plurality of user devices (e.g., a plurality of user devices 201) to media access portal 200, all such digital media content files of the user may thus be consolidated (e.g., associated with a same user account by operation of AAA system 240). Access to all such digital media content files may thus be provided by media access portal 200 to all such files to any appropriate user devices.

In operation according to embodiments of the invention, indexing system 220 and one or more gallery interface (e.g., photo gallery 231, video gallery 232, music gallery 233, document gallery 234, and/or media gallery 235) of media interface 230 cooperate to provide a multiplatform interactive online media experience facilitating a cohesive, online, mobile experience to all of a user's digital media content files. For example, digital media content files stored by database 210 are indexed by indexing system 220 of media access portal 200 to facilitate ready and meaningful access to the digital media content through an appropriate ones of photo gallery 231, video gallery 232, music gallery 233, and document gallery 234. Media gallery 235 of embodiments may be utilized to facilitate access to mixed media (e.g., any or all of the user's photographic, video, music, and/or document content stored by database 210).

Media access portal 200 of the illustrated embodiment is adapted to provide access to digital media content via interfaces other than the aforementioned gallery based interfaces. Accordingly, media access portal 200 includes backup interface 237 (e.g., operable to facilitate backup and/or restore of digital media content files from/to user devices 201), sharing interface 238 (e.g., operable to facilitate sharing of digital media content by a user, such as through social media, direct access, etc.), and virtual drive interface 239 (e.g., operable to facilitate storage device emulation for native digital media content file access by user devices 210).

Digital media content files may be stored by database 210 of media access portal 200 in an arrangement (e.g., file folder hierarchy) corresponding to that of the user device originally storing the digital media content files in order to facilitate use of the files as a backup data set (e.g., for restoring files and file structure), as discussed above. The digital media content files stored by a plurality of a particular user's user devices may be stored by database 210 in arrangements corresponding to that of the particular user device originally storing the digital media content files. Nevertheless, any or all of these digital media content files may be indexed by indexing system 220 to present particular files in one or more intuitive formats for facilitating gallery based access. For example, digital media content files comprising photo content may be indexed to form galleries by date, subject matter, etc. Similarly, digital media content files comprising music content may be indexed to form galleries by genre, artist, album, etc. Likewise, digital media content files comprising video content may be indexed to form galleries by director, subject matter, title, actor, etc. Digital media content files comprising document content may be indexed to form galleries by subject matter, date, document type, etc. Digital media content files of mixed media types may be indexed to form media galleries by subject matter, date, etc. Each of the foregoing gallery organization schemes may be accessed through a corresponding gallery interface of media interface 230 to facilitate use of the files as an interactive data set. Such organization schemes may thus provide aggregated access to digital media content files originally provided by a plurality of different user devices.

Irrespective of how the digital media content files may be stored or indexed for gallery presentation, embodiments of the invention operate to implement MTM connections between particular content according to the concepts herein. Accordingly, digital media content files presented in any of the foregoing galleries may be connected to other particular digital media content, whether indexed into the same gallery or not, by MTM connection information associated therewith. For example, connection linker logic (shown in FIG. 2 as connection linker 231*a*, 232*a*, 233*a*, 234*a*, and 235*a* of the respective gallery interfaces) of media interface 230 may operate to establish MTM connections and/or to implement the connections between various digital media content as appropriate. It should be appreciated that, although connection linker logic is shown only with respect to photo gallery 231, video gallery 232, music gallery 233, document gallery 234, and media gallery 235 of the illustrated embodiment, such connection linker logic may be deployed in any number of configurations, whether in association with galleries or otherwise. For example, connection linker logic may be provided with respect to backup interface 237 to facilitate MTM connection operation in association with backup and restore operations for the digital media content files. Likewise, connection linker logic may be provided with respect to sharing interface 238 to facilitate MTM connection operation in association with shared access to the digital media content files.

In operation according to embodiments of the invention, a user may designate a MTM connection between various digital media content through use of media interface 230. For example, a user may interface with the digital media content files stored by database 210 through media interface 230 (e.g., using a gallery or other interface thereof) and designate one or more connections (e.g., one-to-one connections, one-to-many connections, many-to-one connections, many-to-many connections, unidirectional connection, bidirectional connections, etc.). Moreover, the user may indicate one or more control aspects with respect to the connections through media interface 230.

As one example of designating connections between particular digital media content, a user may be provided access to the user's digital media content through a gallery or other interface of media interface 230, whereby the user interacts with selected digital media content files to designate connections therebetween. For example, a gallery or other interface of media interface 230 may present thumbnails of various digital media content. The user may select particular thumbnails and "drag-and-drop" one or more of the selected thumbnails onto another thumbnail to designate a MTM connection between the corresponding digital media content files. It should be appreciated that there is no limitation regarding the use of thumbnails according to the concepts herein, and thus a user may utilize other content representations (e.g., full representations of the content, textual listings of content, iconic representations of content, etc.) in designating the connections. In response to such designation of connections, connection linker logic of embodiments may operate to provide appropriate connection information to one or more of the digital media content files being connected (e.g., appropriate ones of MTM connection information 113, 123, 133, 143, and/or 153 may be populated with identification information of connected digital media content files, appropriate file path information, index information for an index maintaining information regarding connected digital media content files, control aspects, etc.).

Of course, techniques other than the above mentioned "drag-and-drop" technique may be utilized in designating MTM connections according to embodiments herein. For example, a user may input information through connection linker logic to designate a connection, such as by manually inputting identification information, file path, and/or the like in association with one or more selected digital media content file in order to designate MTM connections to one or more other digital media content file. Additionally or alternatively, connections may be designated automatically or semi-automatically, such as by a user specifying a thematic aspect (e.g., particular subject matter) and the connection linker logic operating to analyze the digital media content (e.g., using facial recognition, pattern matching, text analysis, metadata analysis, etc.) to both automatically identify content to be connected and to provide appropriate connection information to the respective digital media content files.

Embodiments of the invention may provide an indication of the connected status of digital media content which is visible or otherwise discernible to a user. For example, an icon or thumbnail of the connected digital media content may include a visible mark (e.g., the chain links of mark 115 shown in FIG. 1) to indicate that the digital media content is connected to one or more other digital media content. Such a mark may additionally or alternatively be presented in the digital media content itself (e.g., superimposed upon connected photographs, videos, documents, etc.). The marks implemented according to embodiments of the invention may take many forms, such as the aforementioned visible mark, sound marks (e.g., a tone or tones, an audible message, etc.), and/or the like. Moreover, the marks may provide information in addition to indicating that a connection is present, such as to identify the connected digital media content, identify the type of connection, provide information regarding the various operations implicated by the connection, and/or the like.

Designation of connections may comprise providing information in addition to that indicating a connection between particular digital media content. For example, various control aspects may be established with respect to the connection when a connection is designated. In operation according to embodiments of the invention, a user may establish default control aspects (e.g., default selections for bidirectional/unidirectional connections, hierarchy configurations for different media types, enable/disable connection concatenation, etc.). However, embodiments herein provide for a user selecting one or more control aspect with respect to connections being designated to facilitate robust and desired interaction between the digital media content.

Figure 3:
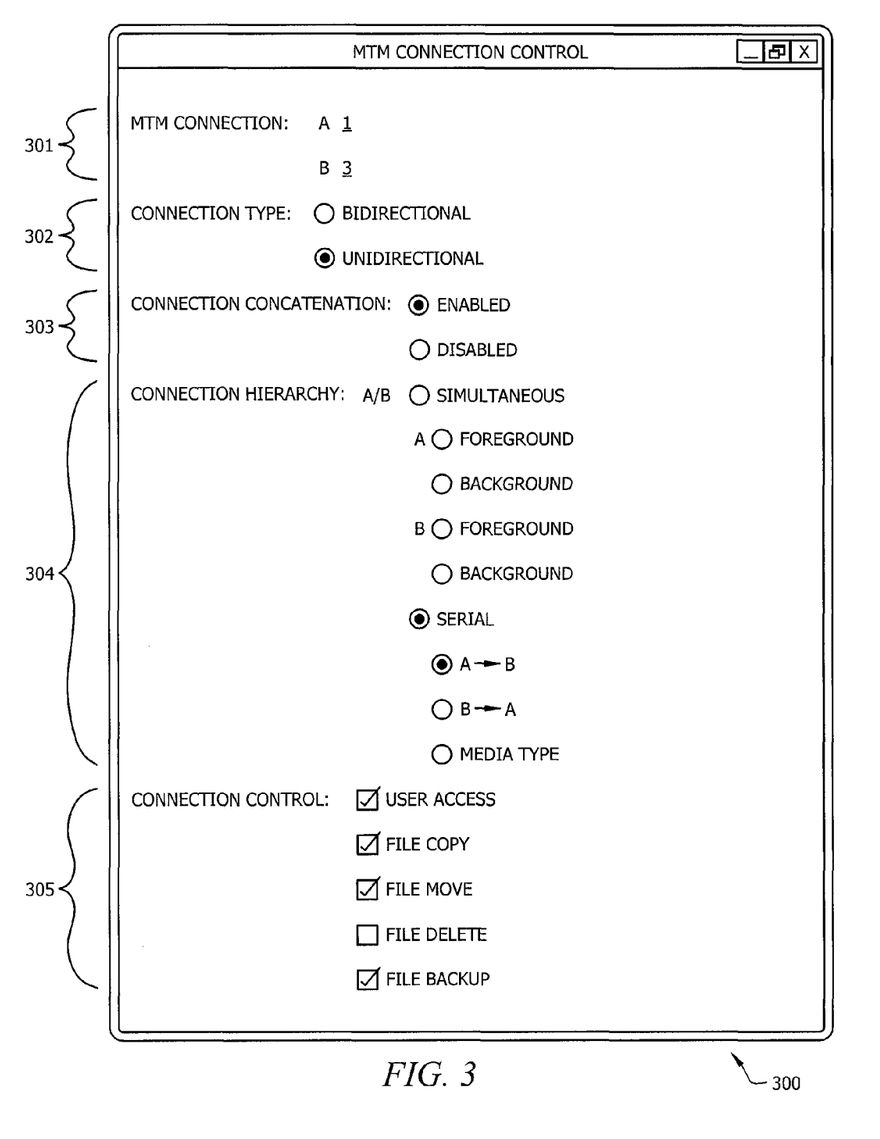
FIG. 3 shows a control input and maintenance interface as may be utilized in designating connections and/or establishing connection control aspects with respect thereto according to embodiments of the invention.

FIG. 3 shows an exemplary MTM connection control input and maintenance interface as may be utilized according to embodiments of the invention in designating connections and/or establishing connection control aspects with respect thereto. The MTM connection control input and maintenance interface illustrated in FIG. 3 comprises dialog box 300, such as may be presented by a graphical user interface operable upon any of user devices 201 and/or as may be served to a user device by media access portal 200. Dialog box 300 of the illustrated embodiment includes various portions for presenting, inputting, modifying, etc. information regarding MTM connections herein.

Portion 301 of the illustrated embodiment of dialog box 300 provides information regarding the particular MTM connection. In the illustrated example, the identification information (e.g., "1" and "3" corresponding to digital media content files 110 and 130 of FIG. 1) for an "A" and "B" node for the connection is provided. It should be appreciated that information in addition to or in the alternative to the aforementioned identification information, such as file path information, index information, etc., may be included in portion 301, if desired. Moreover, more than the two nodes of the illustrated embodiment may be included, such as where a many-to-one, one-to-many, or many-to-many connection is being provided control. It should be appreciated that this information regarding the particular MTM connection may be automatically populated, such as where the user drags-and-drops a digital media content file on another digital media content file to establish a connection, and/or may be manually populated/manipulated, such as where the user manually inputs the connection or modifies the connection.

Portion 302 of dialog box 300 shown in FIG. 3 provides for selection of the connection directionality using the illustrated radio buttons. Specifically, the connection may be selected to be bidirectional (e.g., node A is connected to node B and node B is connected to node A) or unidirectional (e.g., node A is connected to node B without node B being connected to node A). In the illustrated embodiment unidirectional connectivity is selected, consistent with the example of digital media content files 110 and 130 shown in FIG. 1.

Portion 303 of the illustrated embodiment of dialog box 300 provides information regarding connection concatenation. In particular, connection concatenation may enabled or disabled by selection of the illustrated radio buttons. When enabled, connections designated at a node connected to a selected node are also applicable to the access and/or control implemented at the selected node. For example, where concatenation is enabled, a user's access of digital media content file 110 (node A) may not only result in access to connected digital media content file 130 (node B), but also to digital media content file 140 (concatenated node) through the connections designated with respect to connected digital media content file 130.

Portion 304 of dialog box 300 of the embodiment of FIG. 3 provides for hierarchical control of the connected content. For example, the connection may be designated as simultaneous, whereby the connected digital media content files may be accessed at the same time (as perceived by the user) when a selected one of the digital media content files is accessed, or serial, whereby the connected digital media content files may be accessed one after the other when a selected one of the digital media content files is accessed, through selection of the appropriate radio buttons. Various controls may be implemented with respect to the hierarchical status, such as to establish hierarchies based upon the particular content, based on the content type, based upon desired access attributes, and/or the like, using additional radio button selections in the illustrated embodiment.

Portion 305 of dialog box 300 of the illustrated embodiment provides for controlling the types of operations which are implemented by the connection. In particular, the particular management operations to be implemented by the connection are selected through the various checkboxes of the illustrated embodiment. Accordingly, a user may select to have the connection operate to cause corresponding operations, file access, file copy, file move, file delete, and/or file backup, invoked at a connected digital media content file when an operation is performed with respect to a selected digital media content file.

It should be appreciated that, although dialog box 300 of the embodiment illustrated in FIG. 3 provides for a user to manipulate selections for various connection controls, one or more such connection controls may be automatically selected. For example, various defaults may be selected, such as by an administrator or according to a user's preferences, which are used to populate the connection controls implemented with respect to a user's digital media content. Of course, the user may be enabled to alter such defaults, such as through use of an interface such as dialog box 300 of FIG. 3.

Information regarding the foregoing connection controls may be stored in the MTM connection information of the appropriate digital media content files (e.g., appropriate ones of MTM connection information 113, 123, 133, 143, and 153 of digital media content files 110, 120, 130, 140, and 150). Accordingly, the connection control information may provide one or more control aspect to be utilized with respect to the MTM connections established.

In operation, as a user accesses the various digital media content files stored by database 210, such as through any of the galleries or interfaces of media access portal 200, the MTM connection information may be utilized (e.g., through operation of connection linker logic) to identify connections and invoke the appropriate operations with respect to the connected digital media content. Such connections may be utilized to present connected digital media content to a user when the user selects one or more digital media content file for accessing the content thereof. Likewise, such connections may be utilized to provide operational control (e.g., file copying, file moving, file deletion, etc.) with respect to connected digital media content when a user selects one or more digital media content file for a particular operation.

It should be appreciated that although media access portal 200 is shown in illustrative embodiments providing MTM connections according to embodiments herein, the MTM connections may be implemented in accordance with the concepts herein by any of a number of systems. Accordingly, various media interfaces (e.g., media players, browser interfaces, file systems, etc.) may be adapted to implement MTM connections of embodiments of the invention. For example, various media players and other interfaces may be provided with connection linker logic operable to utilize the aforementioned MTM connection information for implementing content connections as described herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
designating a media-to-media (MTM) connection between first digital media content and second digital media content, wherein the MTM connection causes the first digital media content to be aware of the second digital media content; and
storing MTM connection information in a first digital media content file comprising the first digital media content, wherein the MTM connection information specifically identifies a second digital media content file comprising the second digital media content, wherein the MTM connection information comprises one or more MTM connection control aspect for the MTM connection between the first digital media content and the second digital media content, wherein the one or more MTM connection control aspect includes connection type control, wherein the connection type control provides selection between bidirectional and unidirectional connection for the MTM connection, wherein, when the connection between the first digital media content and the second digital media content is a bidirectional connection, selection of either the first digital media content or the second digital media content causes presentation of both the first digital media content and the second digital media content, and wherein, when the connection between the first digital media content and the second digital media content is a unidirectional connection, selection of the first digital media content causes presentation of the first digital media content and the second digital media content, but selection of the second digital media content does not causes presentation of the first digital media content.

2. The method of claim 1, using the MTM connection to access the second digital media content in response to a user accessing the first digital media content.

3. The method of claim 2, wherein the first digital media content and the second digital media content is presented to the user simultaneously using the MTM connection.

4. The method of claim 2, wherein the first digital media content and the second digital media content is presented to the user serially using the MTM connection.

5. The method of claim 1, wherein the MTM connection information comprises identification information for the second digital media content.

6. The method of claim 5, wherein the identification information uniquely identifies the second digital media content.

7. The method of claim 1, wherein the MTM connection information stored in the first digital media content file comprises a file path for the second digital media content file.

8. The method of claim 1, wherein the MTM connection control aspect comprises connection concatenation control information that indicates whether additional digital media content that is connected to the second digital media content but not the first digital media content should be accessed in response to accessing the first digital media content.

9. The method of claim 1, wherein the MTM connection control aspect comprises hierarchical control with respect to the digital media content that is connected to the first digital media content, wherein the hierarchical control indicates whether content that is connected to the first digital media content is to be presented simultaneously with presentation of the first digital media content in response to selection of the first digital media content, or is to be presented serially with respect to the presentation of the first digital media content in response to selection of the first digital media content.

10. The method of claim 1, wherein the MTM connection control aspect comprises control for utilizing the MTM connection in response to one or more selected operation with respect to the first digital media content file.

11. The method of claim 10, wherein the one or more selected operation with respect to the first digital media content file comprises user access to the first digital media content.

12. The method of claim 11, wherein the MTM connection control aspect is utilized to cause the second digital media content to be accessed as a result of the first digital media content being accessed due to the MTM connection between the first digital media content and the second digital media content.

13. The method of claim 10, wherein the one or more selected operation with respect to the first digital media content file comprises at least one operation selected from the group consisting of file copy, file move, file delete, and file backup.

14. The method of claim 13, wherein the MTM connection control aspect is utilized to cause the second digital media content to have the selected operation performed as a result of the first digital media content having the selected operation performed due to the MTM connection between the first digital media content and the second digital media content.

15. The method of claim 1, further comprising:
designating a media-to-media (MTM) connection between first digital media content and third digital media content which, with the MTM connection between the first digital media content and the second digital media content, provides a one-to-many connection with respect to at least the first digital media content, and wherein the MTM connection between first digital media content and third digital media content causes the first digital media content to be aware of the third digital media content; and
storing additional MTM connection information in the first digital media content file comprising the first digital media content, wherein the additional MTM connection information specifically identifies a third digital media content file comprising the third digital media content.

16. The method of claim 1, further comprising:
storing second MTM connection information in the second digital media content file comprising the second digital media content, wherein the second MTM connection information specifically identifies the first digital media content file comprising the first digital media content, and wherein the second MTM connection information causes the second digital media content to be aware of the first digital media content.

17. The method of claim 1, wherein the first digital media content and the second digital media content comprise different forms of media.

18. The method of claim 17, wherein the first digital media content is selected from the group consisting of a digital photograph, a digital video, a digital musical piece, and a digital document, and wherein the second digital media content is a different one of the foregoing group.

19. The method of claim 17, wherein the first digital media content comprises either a digital photograph or a digital musical piece and the second digital media content comprises the other one of a digital photograph or a digital musical piece.

20. A method comprising:
designating a media-to-media (MTM) connection between first digital media content and second digital media content, wherein the MTM connection causes the first digital media content to be aware of the second digital media content; and
storing first MTM connection information in a first digital media content file comprising the first digital media content, wherein the first MTM connection information specifies the designated MTM connection between the first digital media content and the second digital media content and includes one or more control aspect implemented with respect to the MTM connection between the first digital media content and the second digital media content, wherein the one or more control aspect comprises connection type control, wherein the connection type control provides selection between bidirectional and unidirectional connection for the MTM connection, wherein, when the connection between the first digital media content and the second digital media content is a bidirectional connection, selection of the first digital media content causes presentation of the first digital media content and the second digital media content and selection of the second digital media content causes presentation of the first digital media content, and wherein, when the connection between the first digital media content and the second digital media content is a unidirectional connection, selection of the first digital media content causes presentation of the first digital media content and the second digital media content, but selection of the second digital media content does not causes presentation of the first digital media content.

21. The method of claim 20, wherein the first digital media content and the second digital media content is presented to a user simultaneously in accordance with a control aspect of the one or more control aspect.

22. The method of claim 20, wherein the first digital media content and the second digital media content is presented to a user serially in accordance with a control aspect of the one or more control aspect.

23. The method of claim 20, wherein the one or more control aspect comprises connection concatenation control information that indicates whether additional digital media content that is connected to the second digital media content but not the first digital media content should be accessed in response to accessing the first digital media content.

24. The method of claim 20, wherein the one or more control aspect comprises hierarchical control with respect to digital media content that is connected to the first digital media content, wherein the hierarchical control indicates whether content that is connected to the first digital media content is to be presented simultaneously with presentation of the first digital media content in response to selection of the first digital media content, or is to be presented serially with respect to the presentation of the first digital media content in response to selection of the first digital media content.

25. The method of claim 20, wherein the one or more control aspect comprises control for utilizing the MTM connection in response to one or more selected operation with respect to the first digital media content file.

26. The method of claim 25, wherein the one or more selected operation with respect to the first digital media content file comprises user access to the first digital media content.

27. The method of claim 26, wherein the one or more control aspect is utilized to cause the second digital media content to be accessed as a result of the first digital media content being accessed.

28. The method of claim 25, wherein the one or more selected operation with respect to the first digital media content file comprises at least one operation selected from the group consisting of file copy, file move, file delete, and file backup.

29. The method of claim 28, wherein the one or more control aspect is utilized to cause the second digital media content to have the selected operation performed as a result of the first digital media content having the selected operation performed.

30. The method of claim 20, further comprising:
storing second MTM connection information in a second digital media content file comprising the second digital media content, wherein the second MTM connection information specifies the designated MTM connection between the first digital media content and the second digital media content and includes one or more control aspect implemented with respect to the designated MTM connection between the first digital media content and the second digital media content, and wherein the second MTM connection information causes the second digital media content to be aware of the first digital media content.

31. A system comprising:
one or more processors;
a first digital media content file storing first digital media content;
a second digital media content file storing second digital media content, wherein the second digital media content file comprises media-to-media (MTM) connection information designating a MTM connection between the second digital media content and the first digital media content, wherein the MTM connection between the second digital media content and the first digital media content causes the second digital media content to be aware of the first digital media content; and
a media interface operable upon a host computer system, wherein the media interface is adapted to utilize the MTM connection information to invoke an operation with respect to the first digital media content when the operation is invoked with respect to the second digital media content, wherein the media interface is adapted to utilize the MTM connection information of the second digital media content file to invoke a unidirectional MTM connection between the second digital media content and the first digital media content, wherein the unidirectional MTM connection between the second digital media content and the first digital media content causes presentation of the second digital media content and the first digital media content in response to selection of the second digital media content, and wherein selection of the first digital media content causes presentation of the first digital media content but not the second digital media content.

32. The system of claim 31, wherein the media interface comprises a media interface of a centralized media backup service.

33. The system of claim 31, wherein the media interface comprises a media player.

34. The system of claim 31, wherein the operation comprises user access to the second digital media content and the media interface uses the MTM connection to provide corresponding access to the first digital media content.

35. The system of claim 31, wherein the operation comprises a file maintenance operation with respect to the second digital media content and the media interface uses the MTM connection to provide a corresponding file maintenance operation with respect to the first digital media content.

36. The system of claim 35, wherein the file maintenance operation comprises a file maintenance operation selected from the group consisting of file copy, file move, file delete, and file backup.

37. The system of claim 31, wherein the MTM connection information comprises identification information identifying the first digital media content.

38. The system of claim 31, wherein the first digital media content file comprises MTM connection information designating a MTM connection between the first digital media content and the second digital media content, wherein the MTM connection between the first digital media content and the second digital media content causes the first digital media content to be aware of the second digital media content.

39. The system of claim 38, wherein the media interface is adapted to utilize the MTM connection information of a third digital media content file storing third digital media content to invoke a bidirectional MTM connection between the first third media digital content and the second digital media content, wherein the bidirectional MTM connection between the third digital media content and the second digital media content causes presentation of the third digital media content and the second digital media content in response to selection of either the third digital media content or the second digital media content.

40. The system of claim 31, wherein the media interface is adapted to provide access to the first digital media content and the second digital media content serially in accordance with the MTM connection information of the second digital media content file.

41. The system of claim 31, wherein the first digital media content and the second digital media content comprise different forms of media.

42. The system of claim 41, wherein the first digital media content is selected from the group consisting of a digital photograph, a digital video, a digital musical piece, and a digital document, and wherein the second digital media content is a different one of the foregoing group.

* * * * *

UNITED STATES PATENT AND TRADEMARK OFFICE
CERTIFICATE OF CORRECTION

| | | |
|---|---|---|
| PATENT NO. | : 9,298,758 B1 | Page 1 of 1 |
| APPLICATION NO. | : 13/801443 | |
| DATED | : March 29, 2016 | |
| INVENTOR(S) | : Christopher Giordano et al. | |

It is certified that error appears in the above-identified patent and that said Letters Patent is hereby corrected as shown below:

In the Claims:

At column 18, claim number 39, line number 45, delete "first".

Signed and Sealed this
Seventh Day of June, 2016

Michelle K. Lee
*Director of the United States Patent and Trademark Office*